(12) United States Patent
Ruby et al.

(10) Patent No.: US 12,367,137 B2
(45) Date of Patent: Jul. 22, 2025

(54) FREE SPACE AND INPUT/OUTPUT STABILITY MANAGEMENT FOR NON-UNIFORM WORKLOADS

(71) Applicant: SK Hynix NAND Product Solutions Corp., Rancho Cordova, CA (US)

(72) Inventors: Paul Ruby, Folsom, CA (US); David J Pelster, Longmont, CO (US); Mark Anthony Golez, Folsom, CA (US); Teena Sebastian, Newark, CA (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 0 days.

(21) Appl. No.: 18/397,085

(22) Filed: Dec. 27, 2023

(65) Prior Publication Data
US 2025/0217279 A1  Jul. 3, 2025

(51) Int. Cl.
*G06F 12/02* (2006.01)
(52) U.S. Cl.
CPC .. *G06F 12/0246* (2013.01); *G06F 2212/7202* (2013.01); *G06F 2212/7205* (2013.01)
(58) Field of Classification Search
None
See application file for complete search history.

(56) References Cited

U.S. PATENT DOCUMENTS

| | | | |
|---|---|---|---|
| 9,280,459 B2* | 3/2016 | Su | G06F 12/0253 |
| 2012/0191936 A1* | 7/2012 | Ebsen | G06F 12/0253 |
| | | | 711/170 |
| 2017/0123972 A1* | 5/2017 | Gopinath | G06F 3/0616 |
| 2018/0307417 A1* | 10/2018 | Dubeyko | G06F 12/023 |
| 2019/0146684 A1* | 5/2019 | Benisty | G06F 13/4282 |
| | | | 711/102 |
| 2020/0133511 A1* | 4/2020 | Mcgrath | G06F 12/0246 |
| 2021/0200669 A1* | 7/2021 | Bianco | G06F 12/0246 |
| 2021/0216239 A1* | 7/2021 | Dutta | G06F 3/0604 |
| 2022/0269886 A1 | 8/2022 | Wu et al. | |
| 2023/0236966 A1* | 7/2023 | Yarimi | G06F 3/0638 |
| | | | 711/170 |

* cited by examiner

*Primary Examiner* — Stephanie Wu
(74) *Attorney, Agent, or Firm* — Morgan, Lewis & Bockius LLP

(57) ABSTRACT

This application is directed to managing garbage collection using a plurality of queues of memory bands of a memory system. The memory system obtains a request to organize data stored in a plurality of memory bands of the memory system, and each memory band has a data validity level. In response to the request, the memory system generates the plurality of queues of memory bands based on the data validity levels of the plurality of memory bands, and the plurality of queues correspond to a plurality of non-overlapping validity level ranges. The plurality of memory bands are assigned into a subset of queues based on the data validity levels of the plurality of memory bands. The memory system 200 allocates a first memory bandwidth among the subset of queues, and implements garbage collection operations on the subset of queues in parallel using respective portions of the first memory bandwidth.

20 Claims, 10 Drawing Sheets

FREE SPACE AND INPUT/OUTPUT STABILITY MANAGEMENT FOR NON-UNIFORM WORKLOADS

TECHNICAL FIELD

This application relates generally to memory management including, but not limited to, methods, systems, and non-transitory computer-readable storage media for managing memory space of a memory device (e.g. solid-state drive (SSD)) having a non-uniform workload.

BACKGROUND

Memory is employed in a computer system to store instructions and data. The data are processed by one or more processors of the computer system according to the instructions stored in the memory. Multiple memory units are used in different portions of the computer system to serve different functions. Specifically, the computer system includes non-volatile memory that acts as secondary memory to keep data stored thereon if the computer system is decoupled from a power source. Examples of the secondary memory include, but are not limited to, hard disk drives (HDDs) and solid-state drives (SSDs). Garbage collection is often implemented to in the secondary memory to improve write performance. Valid data are moved to reclaim locations storing invalid data in a memory band including erase blocks having the same physical address across all memory dies (bands). Free space is created for future host consumption. In some situations, garbage collection is implemented on bands belonging to two band validity tiers sequentially in a single garbage collection stream, adhering to an interleaving policy. A separation point of and an interleaving ratio of the two band validity tiers are dynamically tuned to stabilize performance metrics of the computer system, e.g., a size of memory free space and a number of input/output operations per second (IOPS). Managing such tuning is often challenging and fails to meet stability requirements for the size of free space and the number of IOPS. It would be beneficial to develop a solution that selects memory bands to be moved efficiently and effectively based on different system characteristics (e.g., data velocity, band validity, and workload non-uniformity) during garbage collection.

SUMMARY

Various embodiments of this application are directed to methods, systems, devices, non-transitory computer-readable storage media for managing memory space of a memory space of a memory system (e.g. solid-state drive (SSD)) having a non-uniform workload. The memory system manages garbage collection dynamically based on a free space level to enhance an input/output operations per second (IOPS) stability. As part of garbage collection, valid data are moved to reclaim invalid locations in memory bands, thereby creating free space for subsequent write operations, where each memory band is identified with a respective physical address and includes erase blocks distributed across different memory dies. The memory bands are classified to two types based on their two data velocity: (1) a hot or dynamic memory band (all called a write amplification band) in which data are written frequently in a primary working space and (2) a cold or static memory band (also called a dust band) in which data are written rarely. In some embodiments, hot and dynamic memory bands have lower validity levels than cold and static memory bands. Based on such a combination of data velocity, band validity and workloads non-uniformity, memory bands to be moved are managed according to a plurality of garbage collection queues during garbage collection. By these means, the memory device can hold free space of the memory device substantially steady and in balance with host IOPs, thereby maintaining host IOP stability (e.g., which is a measure of instantaneous IOPs relative to its long-term average).

In some embodiments, a firmware program implemented by a controller of the memory device includes an IO traffic manager of host requested memory operations and garbage collection and a relocation manager of free space of the memory device. Free space consumption is driven by data written to the memory device via requested memory operations. Conversely, free space production is driven by moving valid data from partially invalidated bands to new bands during garbage collection, when memory bands are erased and be reclaimed for future host requested writes. This mechanism is what is known as garbage collection (also called defragmentation or defrag in some context). The firmware program tracks band information, e.g., number, band type, state (free, open, relocating, closed etc.), and reason why a memory band is relocated. In some implementations, based on the band information, the memory device scans for the two band types (e.g., a hot or dynamic write amplification band, a cold or static dust band), and if both are present, the memory device relocates two memory bands of two garbage collection queues simultaneously on separate streams. This allows for host IOPs stability which is a key factor in meeting performance specific requirements and qualifications. Additionally, these implementation of this application reduces or eliminates a need for tuning the firmware (e.g. tuning a separation point of and an interleaving ratio of the hot and cold memory bands), thereby shortening a time to market and providing balanced memory utilization which helps preserve overall health of the memory device.

In one aspect, a method is implemented for managing garbage collection in a memory system including a controller and non-volatile memory storing data. The method includes obtaining a request (e.g., a garbage collection request) to organize the data in a plurality of memory bands in the memory system, and each memory band has a data validity level. The method further includes in response to the request, generating a plurality of queues of memory bands based on the data validity levels of the plurality of memory bands, where the plurality of queues correspond to a plurality of non-overlapping validity level ranges. The method further includes assigning the plurality of memory bands into a subset of queues of the plurality of queues based on the data validity levels of the plurality of memory bands, allocating a first memory bandwidth among the subset of queues, and implementing garbage collection operations on the subset of queues in parallel using respective portions of the first memory bandwidth.

In some embodiments, the method further includes monitoring a free space size of the memory system and, in accordance with a determination that the free space size of the memory system has been used below a predefined level, generating the request. Further, in some embodiments, the method includes in accordance with a determination that the usage level of the open space of the memory system is above the predefined level, aborting implementing the garbage collect operations. Additionally, in some embodiments, the method further includes in accordance with a determination that the free space size of the memory system is below a critical level that is lower than the predefined level, suspending all host memory requests at least until the usage level of the open space rises above the critical level. In some embodiments, the memory system has a number of IOPS associated with the host memory requests, and the number of IOPS has a stability level that depends on the urgency level and the predefined level of the free space size of the memory system.

Some implementations of this application include an electronic device or a memory system. The electronic device or the memory system includes a controller, a memory device coupled to the controller and including local control circuitry, and memory having instructions stored thereon, which when executed by the memory device cause the memory device to perform any of the above methods.

Some implementations of this application include a memory device that includes control circuitry and memory having instructions stored thereon, which when executed by the control circuitry cause the control circuitry to perform any of the above methods.

Some implementations include a non-transitory computer readable storage medium storing one or more programs. The one or more programs include instructions, which when executed by a memory device cause the memory device to implement any of the above methods.

These illustrative embodiments and implementations are mentioned not to limit or define the disclosure, but to provide examples to aid understanding thereof. Additional embodiments are discussed in the Detailed Description, and further description is provided there.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

Like reference numerals refer to corresponding parts throughout the several views of the drawings.

DETAILED DESCRIPTION

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices using secondary storage.

Various embodiments of this application are directed to methods, systems, devices, non-transitory computer-readable storage media for managing memory space of a memory system (e.g. solid-state drive (SSD)) having a non-uniform workload, e.g., by implementing garbage collection dynamically based on a free space level and an input/output operations per second (IOPS) stability of the memory system. As part of garbage collection, valid data are moved to reclaim invalid locations in memory bands, thereby creating free space for subsequent write operations. The memory bands are classified to two types including a hot or dynamic memory band (all called a write amplification band) in which data are written frequently and a cold or static memory band (also called a dust band) in which data are written rarely, and the hot and dynamic memory bands have lower validity levels than cold and static memory bands. Based on such a combination of data velocity, band validity, and workloads non-uniformity, the memory bands of the memory device to be moved are managed according to a plurality of garbage collection queues that are relocated concurrently on separate streams during garbage collection. By these means, the memory device can hold free space of the memory device substantially steady and in balance with host IOPs, thereby maintaining host IOP stability (e.g., which is a measure of instantaneous IOPs relative to its long-term average). These implementation of this application also reduces or eliminates a need for tuning a separation point of and an interleaving ratio of the hot and cold memory bands, thereby providing balanced memory utilization and preserving overall health of the memory device.

Figure 1:
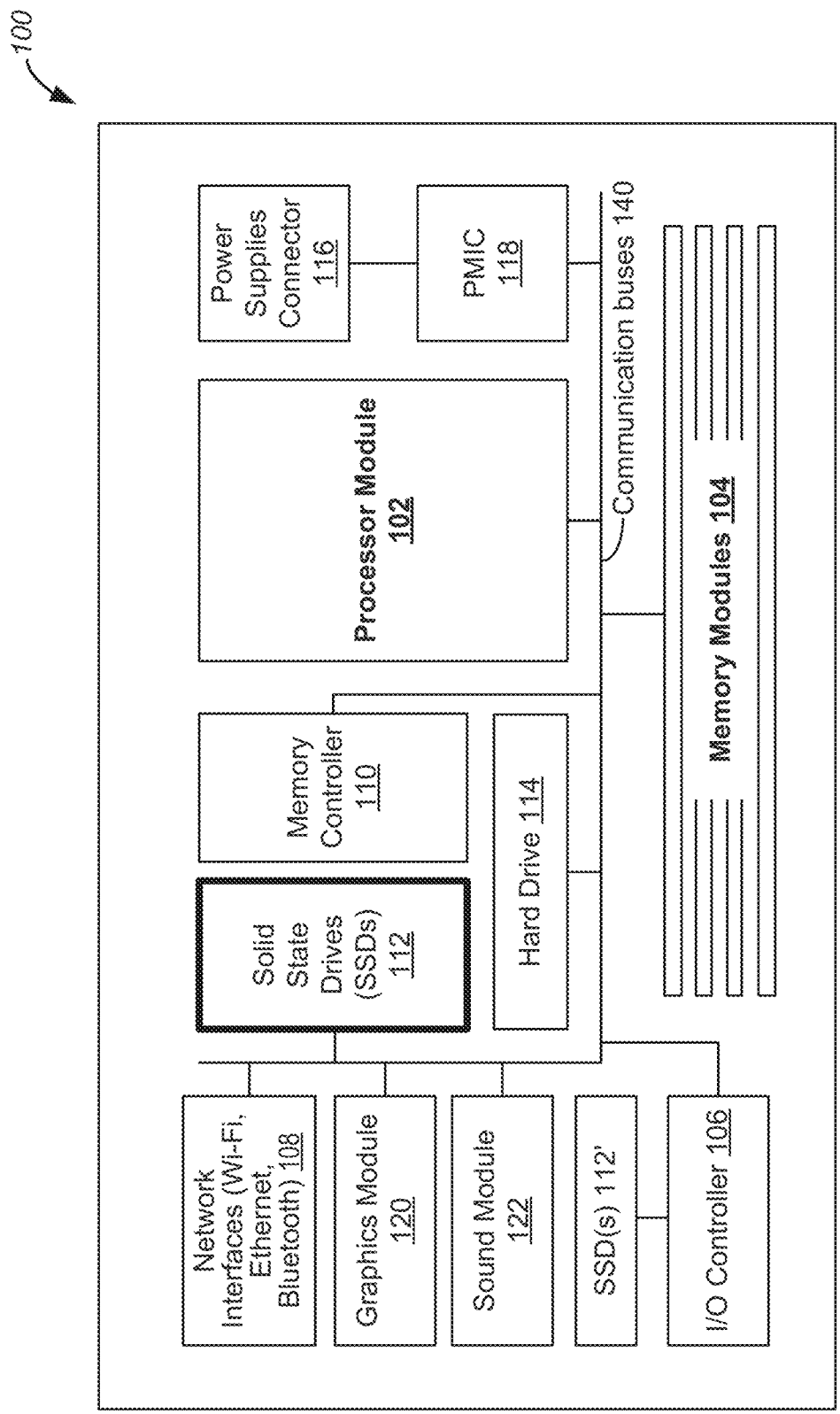
FIG. 1 is a block diagram of an example system module in a typical electronic device in accordance with some embodiments.

FIG. 1 is a block diagram of an example system module 100 in a typical electronic system in accordance with some embodiments. The system module 100 in this electronic system includes at least a processor module 102, memory modules 104 for storing programs, instructions and data, an input/output (I/O) controller 106, one or more communication interfaces such as network interfaces 108, and one or more communication buses 140 for interconnecting these components. In some embodiments, the I/O controller 106 allows the processor module 102 to communicate with an I/O device (e.g., a keyboard, a mouse or a trackpad) via a universal serial bus interface. In some embodiments, the network interfaces 108 includes one or more interfaces for Wi-Fi, Ethernet and Bluetooth networks, each allowing the electronic system to exchange data with an external source, e.g., a server or another electronic system. In some embodiments, the communication buses 140 include circuitry (sometimes called a chipset) that interconnects and controls communications among various system components included in system module 100.

In some embodiments, the memory modules 104 include high-speed random-access memory, such as static random-access memory (SRAM), double data rate (DDR) dynamic random-access memory (DRAM), or other random-access solid state memory devices. In some embodiments, the memory modules 104 include non-volatile memory, such as one or more magnetic disk storage devices, optical disk storage devices, flash memory devices, or other non-volatile solid state storage devices. In some embodiments, the memory modules 104, or alternatively the non-volatile memory device(s) within the memory modules 104, include a non-transitory computer readable storage medium. In some embodiments, memory slots are reserved on the system module 100 for receiving the memory modules 104. Once inserted into the memory slots, the memory modules 104 are integrated into the system module 100.

In some embodiments, the system module 100 further includes one or more components selected from a memory controller 110, SSD(s) 112, an HDD 114, power management integrated circuit (PMIC) 118, a graphics module 120, and a sound module 122. The memory controller 110 is configured to control communication between the processor module 102 and memory components, including the memory modules 104, in the electronic system. The SSD(s) 112 are configured to apply integrated circuit assemblies to store data in the electronic system, and in many embodiments, are based on NAND or NOR memory configurations. The HDD 114 is a conventional data storage device used for storing and retrieving digital information based on electromechanical magnetic disks. The power supply connector 116 is electrically coupled to receive an external power supply. The PMIC 118 is configured to modulate the received external power supply to other desired DC voltage levels, e.g., 5V, 3.3V or 1.8V, as required by various components or circuits (e.g., the processor module 102) within the electronic system. The graphics module 120 is configured to generate a feed of output images to one or more display devices according to their desirable image/video formats. The sound module 122 is configured to facilitate the input and output of audio signals to and from the electronic system under control of computer programs.

Alternatively or additionally, in some embodiments, the system module 100 further includes SSD(s) 112' coupled to the I/O controller 106 directly. Conversely, the SSDs 112 are coupled to the communication buses 140. In an example, the communication buses 140 operates in compliance with Peripheral Component Interconnect Express (PCIe or PCI-E), which is a serial expansion bus standard for interconnecting the processor module 102 to, and controlling, one or more peripheral devices and various system components including components 110-122.

Further, one skilled in the art knows that other non-transitory computer readable storage media can be used, as new data storage technologies are developed for storing information in the non-transitory computer readable storage media in the memory modules 104, SSD(s) 112 or 112', and HDD 114. These new non-transitory computer readable storage media include, but are not limited to, those manufactured from biological materials, nanowires, carbon nanotubes and individual molecules, even though the respective data storage technologies are currently under development and yet to be commercialized.

Figure 2:
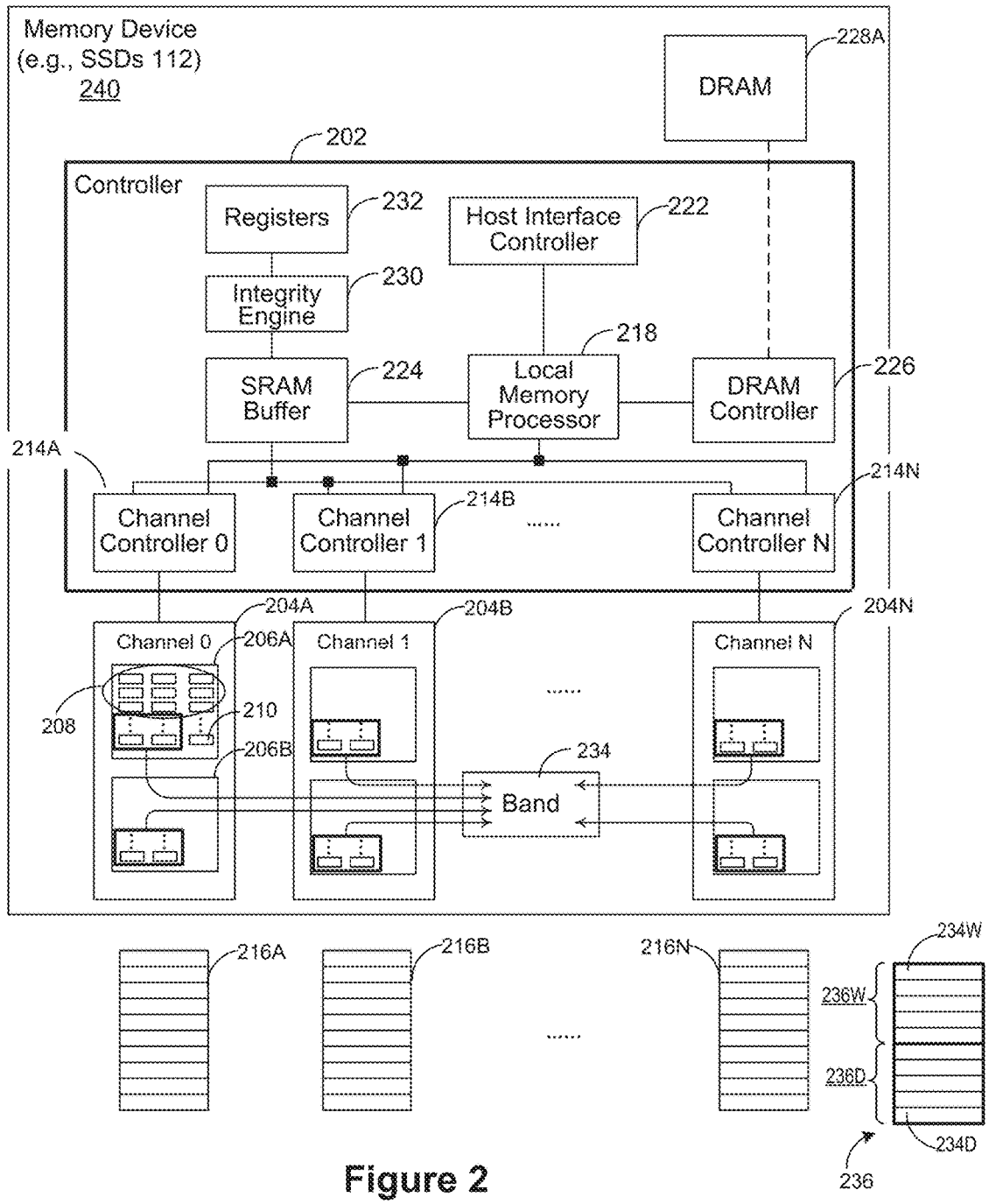
FIG. 2 is a block diagram of a memory system of an example electronic device having one or more memory access queues, in accordance with some embodiments.

FIG. 2 is a block diagram of a memory system 200 of an example electronic device having one or more memory access queues, in accordance with some embodiments. The memory system 200 is coupled to a host device 220 (e.g., a processor module 102 in FIG. 1) and configured to store instructions and data for an extended time, e.g., when the electronic device sleeps, hibernates, or is shut down. The host device 220 is configured to access the instructions and data stored in the memory system 200 and process the instructions and data to run an operating system and execute user applications. The memory system 200 includes one or more memory devices 240 (e.g., SSD(s)). Each memory device 240 further includes a controller 202 and a plurality of memory channels 204 (e.g., channel 204A, 204B, and 204N). Each memory channel 204 includes a plurality of memory cells. The controller 202 is configured to execute firmware level software to bridge the plurality of memory channels 204 to the host device 220. In some embodiments, each memory device 240 is formed on a printed circuit board (PCB).

Each memory channel 204 includes on one or more memory packages 206 (e.g., two memory dies). In an example, each memory package 206 (e.g., memory package 206A or 206B) corresponds to a memory die. Each memory package 206 includes a plurality of memory planes 208, and each memory plane 208 further includes a plurality of memory pages 210. Each memory page 210 includes an ordered set of memory cells, and is identified by a respective physical address. In some embodiments, the memory device 240 includes a plurality of bands 234. Each band 234 includes a plurality of memory blocks each of which further includes a plurality of memory pages 210. For each super-block, the plurality of memory blocks are configured to be written into and read from the memory system via a memory input/output (I/O) interface concurrently. Optionally, each band 234 groups memory blocks that are distributed on a plurality of memory planes 208, a plurality of memory channels 204, and a plurality of memory dies 206. In an example, each band 234 includes at least one set of memory pages, where each page is distributed on a distinct one of the plurality of memory dies 206, has the same die, plane, block, and page designations, and is accessed via a distinct channel of the distinct memory die 206. In another example, each band 234 includes at least one set of memory blocks, where each memory block is distributed on a distinct one of the plurality of memory dies 206 includes a plurality of pages, has the same die, plane, and block designations, and is accessed via a distinct channel of the distinct memory die 206. For each band 234, the respective pages 210 are located on the same addresses of the distinct memory die 206. The memory device 240 stores information of an ordered list of bands 234 in a cache of the memory device 240. In some embodiments, the cache is managed by a host driver of the host device 220, and called a host managed cache (HMC).

In some embodiments, the memory device 240 includes a single-level cell (SLC) NAND flash memory chip, and each memory cell stores a single data bit. In some embodiments, the memory device 240 includes a multi-level cell (MLC) NAND flash memory chip, and each memory cell of the MLC NAND flash memory chip stores 2 data bits. In an example, each memory cell of a triple-level cell (TLC) NAND flash memory chip stores 3 data bits. In another example, each memory cell of a quad-level cell (QLC)

NAND flash memory chip stores 4 data bits. In yet another example, each memory cell of a penta-level cell (PLC) NAND flash memory chip stores 5 data bits. In some embodiments, each memory cell can store any suitable number of data bits. Compared with the non-SLC NAND flash memory chips (e.g., MLC SSD, TLC SSD, QLC SSD, PLC SSD), the SSD that has SLC NAND flash memory chips operates with a higher speed, a higher reliability, and a longer lifespan, and however, has a lower device density and a higher price.

Each memory channel 204 is coupled to a respective channel controller 214 (e.g., controller 214A, 214B, or 214N) configured to control internal and external requests to access memory cells in the respective memory channel 204. In some embodiments, each memory package 206 (e.g., each memory die) corresponds to a respective queue 216 (e.g., queue 216A, 216B, or 216N) of memory access requests. In some embodiments, each memory channel 204 corresponds to a respective queue 216 of memory access requests. Further, in some embodiments, each memory channel 204 corresponds to a distinct and different queue 216 of memory access requests. In some embodiments, a subset (less than all) of the plurality of memory channels 204 corresponds to a distinct queue 216 of memory access requests. In some embodiments, all of the plurality of memory channels 204 of the memory device 240 corresponds to a single queue 216 of memory access requests. Each memory access request is optionally received internally from the memory device 240 to manage the respective memory channel 204 or externally from the host device 220 to write or read data stored in the respective channel 204. Specifically, each memory access request includes one of: a system write request that is received from the memory device 240 to write to the respective memory channel 204, a system read request that is received from the memory device 240 to read from the respective memory channel 204, a host write request that originates from the host device 220 to write to the respective memory channel 204, and a host read request that is received from the host device 220 to read from the respective memory channel 204. It is noted that system read requests (also called background read requests or non-host read requests) and system write requests are dispatched by a memory controller to implement internal memory management functions including, but are not limited to, garbage collection, wear levelling, read disturb mitigation, memory snapshot capturing, memory mirroring, caching, and memory sparing.

In some embodiments, in addition to the channel controllers 214, the controller 202 further includes a local memory processor 218, a host interface controller 222, an SRAM buffer 224, and a DRAM controller 226. The local memory processor 218 accesses the plurality of memory channels 204 based on the one or more queues 216 of memory access requests. In some embodiments, the local memory processor 218 writes into and reads from the plurality of memory channels 204 on a memory block basis. Data of one or more memory blocks are written into, or read from, the plurality of channels jointly. No data in the same memory block is written concurrently via more than one operation. Each memory block optionally corresponds to one or more memory pages. In an example, each memory block to be written or read jointly in the plurality of memory channels 204 has a size of 16 KB (e.g., one memory page). In another example, each memory block to be written or read jointly in the plurality of memory channels 204 has a size of 64 KB (e.g., four memory pages). In some embodiments, each page has 16 KB user data and 2 KB metadata. Additionally, a number of memory blocks to be accessed jointly and a size of each memory block are configurable for each of the system read, host read, system write, and host write operations.

In some embodiments, the local memory processor 218 stores data to be written into, or read from, each memory block in the plurality of memory channels 204 in an SRAM buffer 224 of the controller 202. Alternatively, in some embodiments, the local memory processor 218 stores data to be written into, or read from, each memory block in the plurality of memory channels 204 in a DRAM buffer 228A that is included in memory device 240, e.g., by way of the DRAM controller 226. Alternatively, in some embodiments, the local memory processor 218 stores data to be written into, or read from, each memory block in the plurality of memory channels 204 in a DRAM buffer 228B that is main memory used by the processor module 102 (FIG. 1). The local memory processor 218 of the controller 202 accesses the DRAM buffer 228B via the host interface controller 222.

In some embodiments, data in the plurality of memory channels 204 is grouped into coding blocks, and each coding block is called a codeword. For example, each codeword includes n bits among which k bits correspond to user data and (n–k) corresponds to integrity data of the user data, where k and n are positive integers. In some embodiments, the memory device 240 includes an integrity engine 230 (e.g., an LDPC engine) and registers 232, which include a plurality of registers or SRAM cells or flip-flops and are coupled to the integrity engine 230. The integrity engine 230 is coupled to the memory channels 204 via the channel controllers 214 and SRAM buffer 224. Specifically, in some embodiments, the integrity engine 230 has data path connections to the SRAM buffer 224, which is further connected to the channel controllers 214 via data paths that are controlled by the local memory processor 218. The integrity engine 230 is configured to verify data integrity and correct bit errors for each coding block of the memory channels 204.

In some implementations of this application, the memory system 200 manages garbage collection using a plurality of queues 236 of memory bands 234, thereby stabilizing a free space level and an IOPS of the memory system 200 (e.g. solid-state drive (SSD)) having a non-uniform workload. Each memory page 210 is addressed on a respective memory die 206 based on a distinct physical address, and corresponds to a respective memory page 210 sharing the same physical address on each of a remainder of memory dies 206 of the memory system 200. A memory block includes one or more memory pages 210 on an associated memory die 206, and corresponds to a respective memory block located at the same location of each of a reminder of memory dies 206 of the memory system 200. These memory blocks distributed on the memory dies 206 of the memory system 200 form a memory band 234 associated with a set of physical address of their associated memory pages 210. The memory system 200 obtains a request (e.g., a garbage collection request) to organize data stored in a plurality of memory bands 234 of the memory system 200, and each memory band 234 has a data validity level. In response to the request, the memory system 200 generates the plurality of queues 236 of memory bands based on the data validity levels of the plurality of memory bands 234, and the plurality of queues 236 correspond to a plurality of non-overlapping validity level ranges. The plurality of memory bands 234 are assigned into the plurality of queues 236 based on the data validity levels of the plurality of memory bands. The memory system 200 allocates a first memory bandwidth among the subset of queues, and implements garbage collection operations on the subset of queues in parallel using respective portions of the first memory bandwidth.

Figure 3:
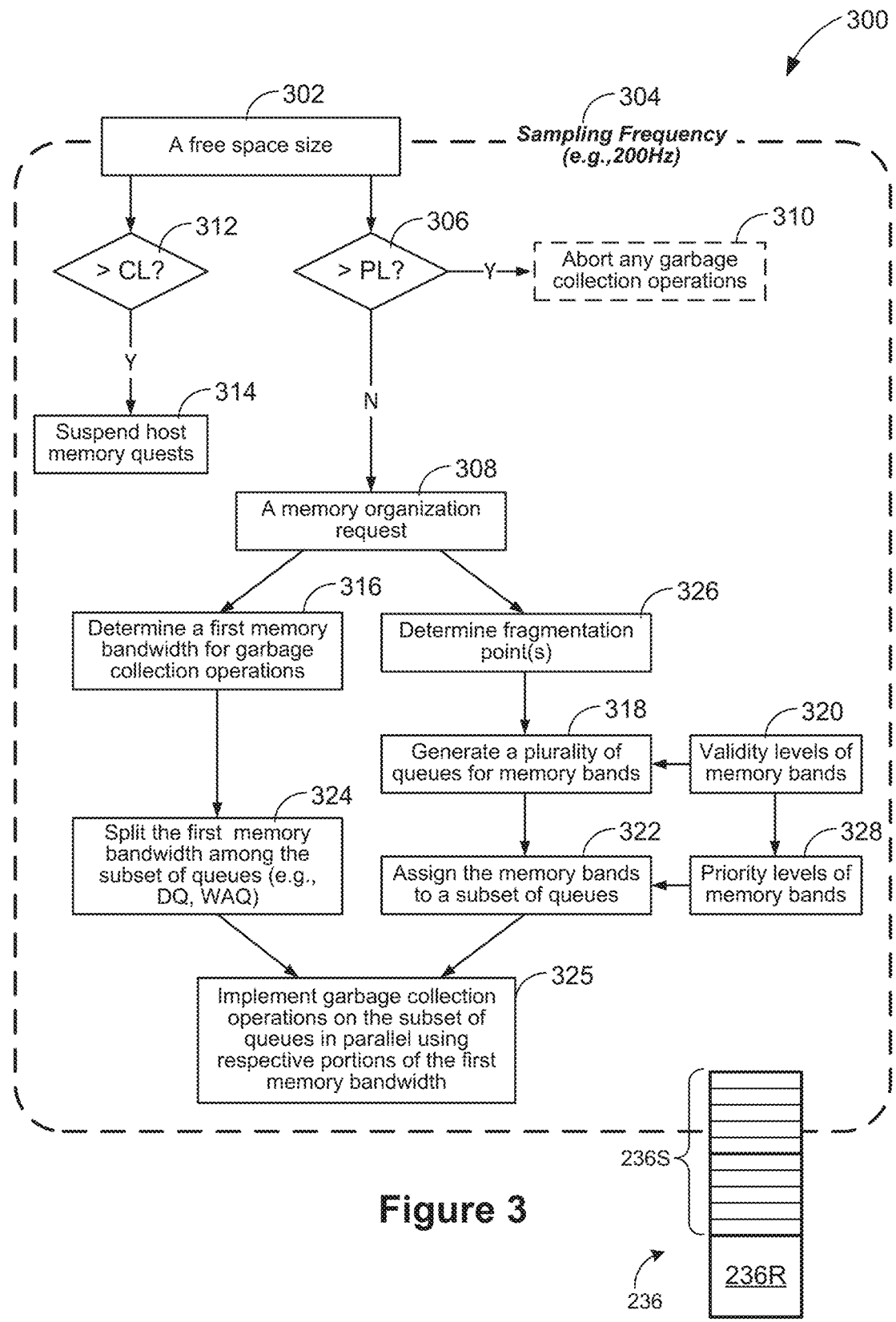
FIG. 3 is a flow diagram of an example process of managing garbage collection in a memory system, in accordance with some embodiments.

FIG. 3 is a flow diagram of an example process 300 of managing garbage collection in a memory system 200, in accordance with some embodiments. A free space size 302 of the memory system 200 is measured according a sampling frequency 304. In an example, the sampling frequency is 200 Hz. The free space size 302 indicates a size of free space left in the memory system 200, and is complementary to a usage level of memory space. The higher the usage level of memory space, the smaller the free space size 302 of the memory system 200. In some embodiments, the free space size 302 of the memory system 200 is compared (operation 306) with a predefined level PL. In accordance with a determination that the free space size 302 of the memory system 200 is below (or not above) the predefined level PL, the memory system 200 generates a memory organization request 308. Conversely, in some embodiments, in accordance with a determination that the free space size of the memory system is above (or not below) the predefined level PL (e.g., a start setpoint 402B in FIG. 4), the memory system 200 aborts (operation 310) implementing garbage collect operations. Further, in some embodiments, the free space size 302 of the memory system 200 is compared (operation 312) with a critical level CL (e.g., a critical setpoint 402E) that is lower than the predefined level PL. In accordance with a determination that the free space size 302 of the memory system 200 is below the critical level CL, the memory system 200 suspends (operation 314) all host memory requests (e.g., for read and write) at least until the free space size 302 rises above the critical level CL. In some embodiments, the memory system 200 has a number of IOPS associated with the host memory requests, and the number of IOPS has a stability level that depends on at least the predefined level of the free space size 302 of the memory system 200 and the urgency level UL.

The memory organization request 308 is made for organizing data stored in a plurality of memory bands 234 of the memory system 200. Each memory band 234 includes a plurality of memory blocks that are located on different memory dies 206 of the memory system 200 addressed by the same set of respective physical addresses. Each memory band 234 has a respective data validity level. In response to the organization request 308, the memory system 200 determines (operation 316) a first memory bandwidth for garbage collection, and generates (operation 318) a plurality of queues 236 of memory bands 234 based on the data validity levels 320 of the plurality of memory bands 234. The plurality of queues 236 include a plurality of non-overlapping validity level ranges. For example, the plurality of queues 236 include a dust queue 236D and a write amplification queue 236W (FIG. 2). The plurality of memory bands 234 are assigned (operation 322) into a subset of non-empty queues 236S of the plurality of queues 236 based on the data validity levels 320 of the plurality of memory bands 234. The memory system 200 allocates (operation 324) the first memory bandwidth among the subset of queues 236S, and implements (operation 325) garbage collection operations on the subset of queues 236S in parallel using respective portions of the first memory bandwidth. In some embodiments, the plurality of queues 236 include one or more queues 236R that are empty.

Figure 4:
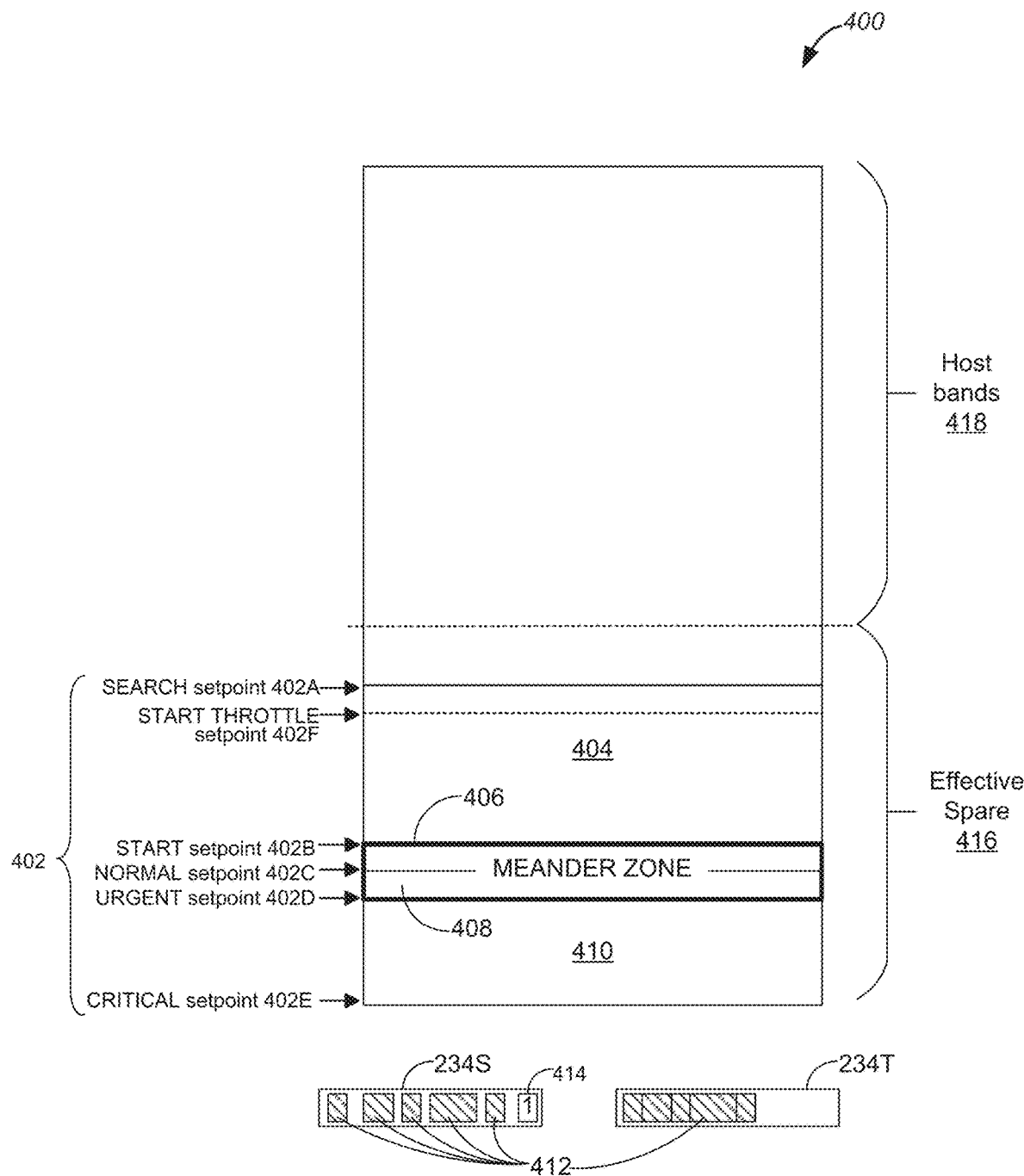
FIG. 4 is a diagram illustrating an example ordered sequence of setpoints 402 for controlling garbage collection, in accordance with some embodiments.

In some embodiments, determination of fragmentation point (326), queue generation (318/320) and ordered band population of said queues (322/328) happen when free space (302) is below search set-point 402A (FIG. 4). Operations 308, 316 and 324 happens after free space (302) is below start set-point 402B (FIG. 4).

In some embodiments, the memory system 200 identifies (operation 326) one or more fragmentation points (e.g., 602 in FIG. 6) based on the data validity levels 320 of the plurality of memory bands 234 to define the plurality of non-overlapping validity level ranges. Each of the plurality of queues 236 of memory bands 234 correspond to a respective one of the plurality of non-overlapping validity level ranges.

In some embodiments, each of the plurality of memory bands 234 has a respective priority level 328, in a respective queue 236 of memory bands, which is determined based on at least an associated validity level 320. Alternatively, in some embodiments, each of the plurality of memory bands 234 has a respective priority level 328, in a respective queue 236 of memory bands, which is determined based on the associated validity level 320 and one or more additional band characteristics (e.g., a band age). Stated another way, in some embodiments, the plurality of memory bands 234 are ordered (operation 322) in their respective queues based on their respective priority levels.

FIG. 4 is a diagram 400 illustrating an example ordered sequence of setpoints 402 for controlling garbage collection, in accordance with some embodiments. Data is written to memory pages 210 located on free space of the memory system 200. The free space is categorized into a plurality of control zones 404-410 demarcated by a plurality of setpoints 402. For instance, free space is categorized into the plurality of zones 404-410 based on the plurality of setpoints 402. The plurality of setpoints 402 are ordered from highest to lowest to include one or more of: a search setpoint 402A, a start setpoint 402B, a normal setpoint 402C, an urgent setpoint 402D, and a critical setpoint 402E. In some embodiments, free space of the non-volatile memory of the memory system 200 is broadly classified to effective spare bands 416 and host bands 418 based on the free space size. The effective spare bands 416 are required by the memory system 200 for garbage collection and not visible to the host 220, and conversely, the host bands 418 are space visible to the host 220.

In some embodiments, a search zone 404 corresponds to a free space size of the memory system (e.g., related to a free space size) that is below the search setpoint 402A and above the start setpoint 402B. The memory system 200 starts to search for memory bands 234 for garbage collection, and however, does not implement any garbage collection operation yet. In some embodiments, the search zone 404 includes a start throttle setpoint 402F where the memory system 200 starts throttling host memory requests (i.e., memory requests from the host 220) in preparation for garbage collection at the start setpoint 402B. As such, in accordance with a determination that the free space size is lower than the start throttle setpoint 402F, the host memory requests are reduced to prepare for garbage collection. It is noted that in some embodiments, operations 326, 318, 320, 322, 328 of FIG. 3 are implemented when the free space size of the memory system 200 is in the search zone 404, such that the memory system is prepared start garbage collection when the free space size hits the start setpoint 402B.

In some embodiments, a meander zone 406 corresponds to the free space size of the memory system 200 that drops below the start setpoint 402B and stays above the urgent setpoint 402D. Garbage collection operations are enabled and initiated to create free space actively for the memory system 200. In some embodiments, the meander zone 406 includes a normal zone 408 where the free space size of the memory system 200 drops below the normal setpoint 402C and stays above the urgent setpoint 402D. Further, in some embodiments, free space creation matches free space consumption, and a free space creation rate of the garbage collection operation is substantially equal to a space consumption rate of host memory requests within the normal zone 408 of the meander zone 406. In an urgent zone 410, the free space size of the memory system 200 drops below the urgent setpoint 402D, e.g., while above the critical setpoint 402E. The memory system 200 aggressively throttles the host memory requests and prioritize garbage collection in favor of free space creation with the urgent zone 410.

The memory system 200 maintains a size of the free space within the meander zone 406, which is monitored and controlled using the start setpoint 402B, the normal setpoint 402C, and the urgent setpoint 402D of the free space sizes. Specifically, in some embodiments, the memory system 200 monitors the free space size of the memory system 200. In response to the organization request 308, the memory system 200 controls the free space size of the memory system 200 in the meander zone 406 having a space size range (e.g., between the setpoints 402B and 402D) that is smaller than a predefined range. Further, the memory system 200 has a number of input/output operations per second (IOPS) associated with the host memory requests, and the number of IOPS has a stability level that depends on the space size range of the meander zone 406 of the memory system 200. The stability level is higher than a stability target. Stated another way, in some embodiments, the meander zone 406 is set to be substantially narrow, and the stability level of the IOPS of the memory system 200 is therefore kept at a substantially higher stability level, e.g., above the stability target. By these means, overall health of the memory system 200 is guaranteed, particularly when the meander zone 406 is controlled to be substantially narrow using the setpoints 402B-402D.

During garbage collection, a memory device 240 (specifically, a controller 202 thereof) reads valid data 412 from a source band 234S and rewrites that valid data 412 to a destination band 234T distinct from the source band 234S. The memory device 240 also invalidates the old copy of the data stored in the source band 234S (e.g., by setting one or more data bits 414 of a data block to a known data value to indicate that the data stored there is invalid). This contributes to write amplification by increasing a ratio of a total number of writes to a number of host-initiated writes. Garbage collection is implemented to make free space in an optimal manner to minimize write amplification, free space inability, and IOPS instability and to maximize drive performance and lifetime, e.g., by way of reducing a number of program erase cycles.

Figure 5A:
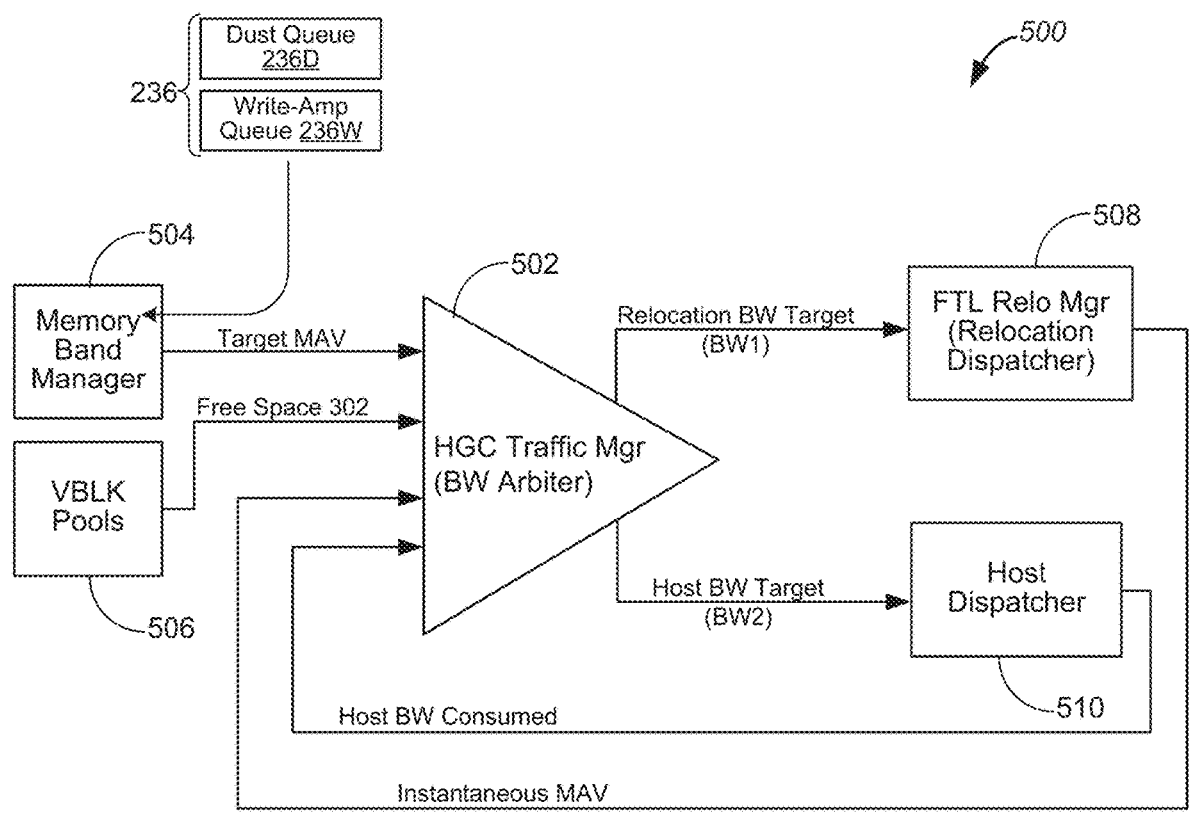
FIG. 5A is a block diagram of an example firmware program for managing garbage collection of a memory system, in accordance with some embodiments.

FIG. 5A is a block diagram of an example firmware program 500 for managing garbage collection of a memory system 200, in accordance with some embodiments. The firmware program 500 is implemented by a controller 202 of the memory system 200, and configured to divide a memory operation capability of the memory system 200 adaptively into at least a first memory bandwidth $BW_1$ and a second memory bandwidth $BW_2$. The first memory bandwidth $BW_1$ is allocated to implement garbage collection on a subset of a plurality of queues 236 of memory bands, and the second memory bandwidth $BW_2$ is allocated to implement a plurality of host memory requests. Specifically, the firmware program 500 includes a traffic manager 502 (also called bandwidth arbiter), a memory band manager 504, a virtual block (VBLK) pool 506, a relocation manager 508 (also called relation dispatcher), and a host dispatcher 510. The Memory Band Manager 504 manages a plurality of queues 236 of memory bands 234 corresponding to a plurality of non-overlapping validity level ranges to implement garbage collection.

The memory band manager 504 manages the plurality of queues 236 of memory bands 234 (e.g., the dust queue 236D and the write amplification queue 236W), and provides a target moving average of the validity levels (i.e., MAV) of a plurality of memory bands 234 that needs to be processed by garbage collection. The VBLK pools 506 provides information about free space in the memory system 200 including a free space size 302 (FIG. 3). The relocation manager 508 is configured to provide an instantaneous moving average validity (MAV) level of one or more memory bands 234 that are being processed via the plurality of queues 236 of memory bands 234. The host dispatcher 510 is configured to provide a host consumed bandwidth $BW_H$. The traffic manager 502 receives one or more of: the target MAV level, the free space size 302, the host consumed bandwidth $BW_H$, and the instantaneous MAV level, and determines the first memory bandwidth $BW_1$ for garbage collection and the second memory bandwidth BW2 for processing the host memory requests. Specifically, in some embodiments, the first memory bandwidth is determined as follows:

$$BW_1 = BW_H \cdot \frac{1}{1-MAV} \cdot (1 + (MAV_T - MAV)) \quad (1)$$

where $BW_1$ is the first memory bandwidth, $BW_H$ is a second memory bandwidth actually used to implement the plurality of host memory requests, MAV is a current moving average validity level of a current memory band that is being processed for garbage collection, and $MAV_T$ is a target MAV level of the plurality of memory bands.

Figure 5B:
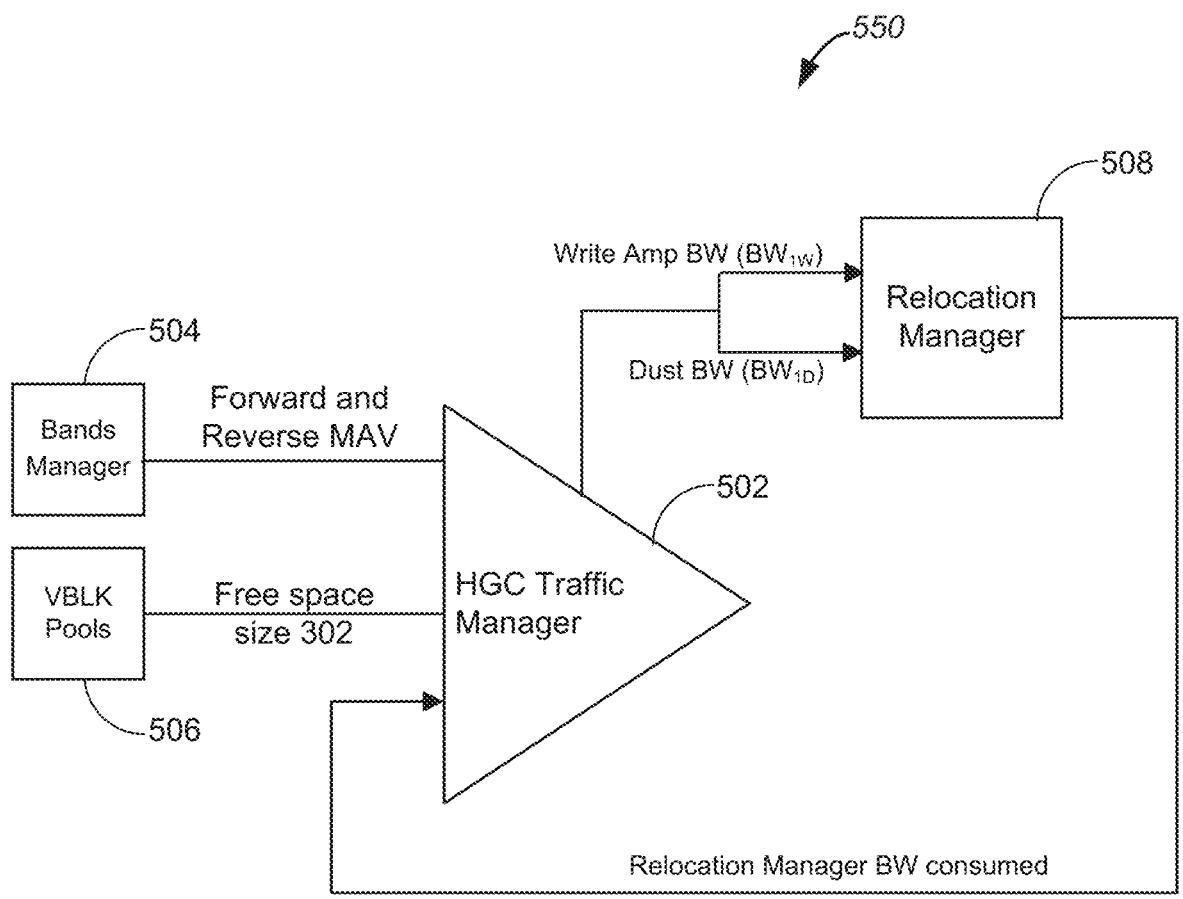
FIG. 5B is a block diagram of another example firmware program for implementing garbage collection using a plurality of queues 236 of memory bands, in accordance with some embodiments.

FIG. 5B is a block diagram of another example firmware program 550 for implementing garbage collection using a plurality of queues 236 of memory bands 234, in accordance with some embodiments. The firmware program 550 is also implemented by a controller 202 of the memory system 200, and configured to further allocate the first memory bandwidth $BW_1$ among the plurality of queues 236 of memory bands 234. The memory band manager 504 provides a target MAV level of a plurality of memory bands 234 that needs to be processed by garbage collection. The VBLK pools 506 provides information about free space in the memory system 200 including a free space size 302 (FIG. 3). The relocation manager 508 is configured to provide a consumption rate of the first memory bandwidth $BW_1$ allocated to garbage collection. The traffic manager 502 receives one or more of: the target MAV level, the free space size 302, and the consumption rate of the first memory bandwidth $BW_1$, and determines respective portions of the first memory bandwidth $BW_1$ allocated to the plurality of queues 236 of memory bands 234.

In some embodiments, the plurality of queues 236 include both a dust queue 236D and a write amplification queue 236W having a lower average validity level than the dust queue 236D. The first memory bandwidth $BW_1$ is allocated to at least one of the dust queue 236D and the write amplification queue 236W. In some embodiments, in accordance with a determination that each of the dust queue 236D and the write amplification queue 236W is assigned with at least one memory band 234, the memory system 200 splits the first memory bandwidth $BW_1$ equally between the dust queue 236D and the write amplification queue 236W. Each of a bandwidth $BW_{1D}$ allocated to the dust queue 236D and a bandwidth $BW_{1W}$ allocated to the write amplification queue 236W is equal to a half of the first memory bandwidth $BW_1$. Alternatively, in some embodiments, in accordance with a determination that the dust queue 236D is empty, the memory system 200 allocates the first memory bandwidth $BW_1$ entirely to the write amplification queue 236W, and the bandwidth $BW_{1W}$ allocated to the write amplification queue 236W is equal to the first memory bandwidth $BW_1$.

Stated another way, in some embodiments, at least two separate streams are applied to process two queues 236D and 236W of memory bands 234 for write amplification bands 234W and dust bands 234D, respectively. The worst-case range of validity levels of memory bands 234 in each queue of memory bands is smaller than a range of validity levels of all memory bands 234 of the memory system 200. The free space size 302 is strictly controlled, e.g., within a meander zone 406 (FIG. 4) which is substantially narrow in some situations, to enhance IOPS stability for host memory access requests.

In some embodiments, a free space size 302 (FIG. 3) is controlled substantially close to the normal setpoint 402C (FIG. 4), e.g., within a substantially small threshold variation, while two separate queues 236D and 236W of memory bands 234 (e.g., a queue 236W of write amplification bands 234W, a queue 236D of dust bands 234D) are applied for garbage collection. In some embodiments, each candidate memory band 234 is allocated to a respective one of the two queues 236D and 236W of memory bands 234 based on the MAV level of bands in the respective queue 236D or 236W of memory bands 234. For example, in some embodiments, a new dust band 234D in the dust queue 236D is chosen for relocation and is subsequently processed. A dust MAV is averaged into the write amplification MAV to generate a combined MAV level, which is higher than a baseline of the MAV level of the write amplification queue 236W. This combined MAV level determines how quickly the relocation manager 508 processes a memory band 234. A memory band 234 that has lower actual validity (example write amplification bands 234W) than the combined MAV level yields more free space, proportional to a difference between the band's actual validity and the combined MAV level. This is because the combined MAV level determines how quickly the relocation manager 508 processes a memory band 234. A memory band 234 that has higher actual validity (example dust bands 234D) than the combined MAV level yields less free space, proportional to a difference between the band's actual validity and the combined MAV level. This is because the combined MAV determines how quickly the relocation manager 508 processes a memory band 234. Since the combined MAV targeting a 50/50 split is an average of the MAV levels of the queues 236D and 236W, the free space difference is proportional in opposite directions yielding a net zero free space difference across memory band boundaries. Thus, a 50/50 split between the queues 236D and 236W results in a net zero free space difference across memory band boundaries.

In some embodiments, the host 220 overwrites a relatively small number of data bits to logical block addresses (LBAs) within a relatively large swatch of static data. Specifically, in some embodiments, a dust band 234D refers to a memory band 234 that is mostly static and has small amount of invalid data. A write frequency is lower than a threshold write frequency, and the amount of invalid data is lower than a threshold invalidity level.

Figure 6:
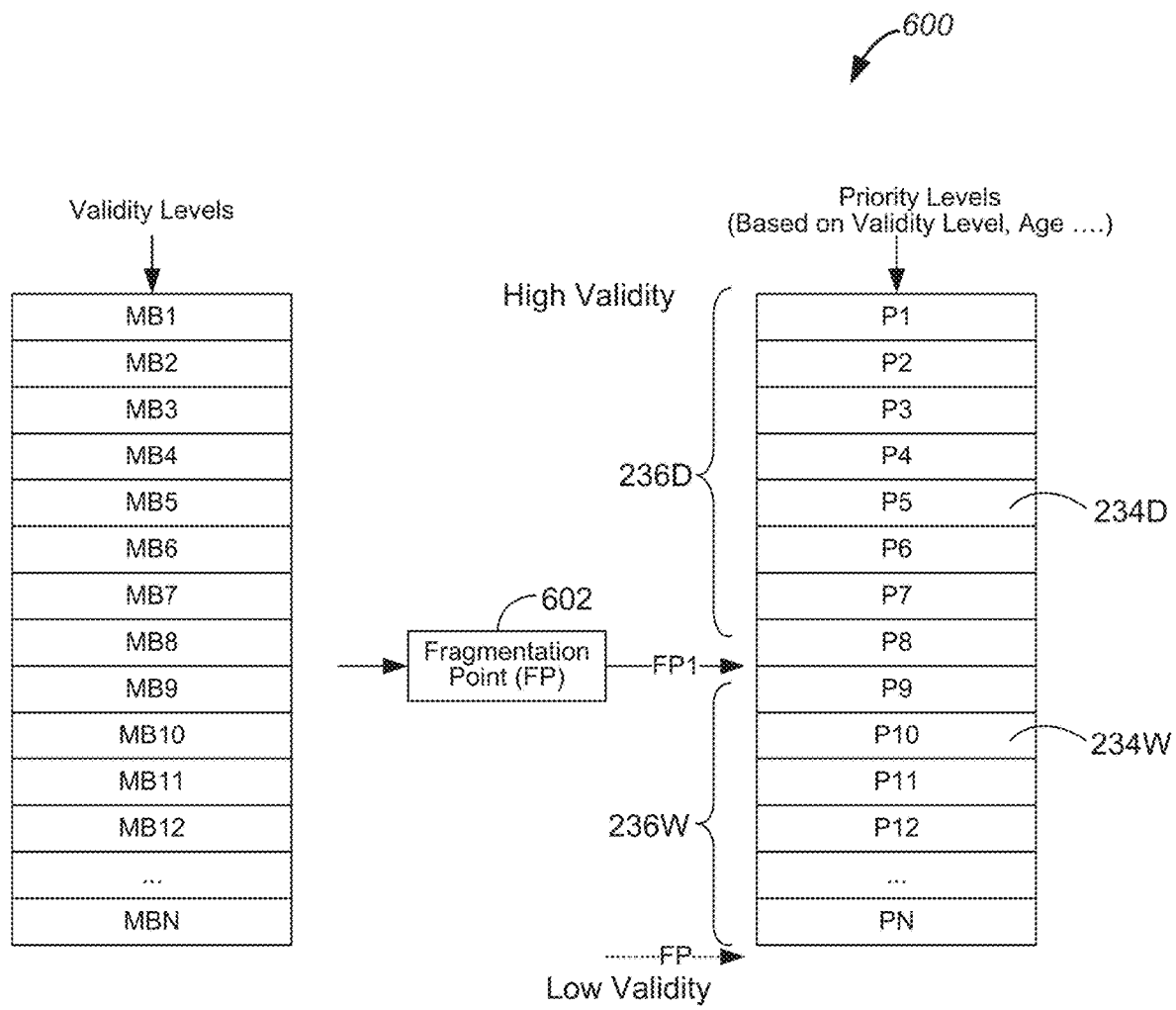
FIG. 6 is a diagram illustrating a plurality of memory bands that are separated into a plurality of queues of memory bands based on one or more fragmentation points, in accordance with some embodiments.

FIG. 6 is a diagram 600 illustrating a plurality of memory bands 234 that are separated into a plurality of queues 236 of memory bands 234 based on one or more fragmentation points 602, in accordance with some embodiments. As explained above, each memory band 234 to be relocated for garbage collection has a data validity level 320, and data validity levels 320 of a plurality of memory bands 234 (e.g., MB1, MB2, ..., MBN) to be relocated are used to generate a plurality of queues 236 of memory bands 234. The plurality of queues 236 correspond to a plurality of non-overlapping validity level ranges. In some embodiments, the memory system 200 identifies one or more fragmentation points 602 based on the data validity levels of the plurality of memory bands 234 to define the plurality of non-overlapping validity level ranges.

In some embodiments, the one or more fragmentation points 602 include a first fragmentation point FP1 defining two of the plurality of non-overlapping validity level ranges corresponding to a dust queue 236D and a write amplification queue 236W included in the plurality of queues 236 of memory bands 234. For example, the dust queue 236D corresponds to a first validity level range (e.g., >FP1) covering validity levels higher than the first fragmentation point FP1, and the write amplification queue 236W corresponds to a second validity level range (e.g., ≤FP1) covering validity levels equal to or lower than the first fragmentation point FP1. In other words, each memory band 234D having the data validity level above the first fragmentation point FP1 is assigned to the dust queue 236D, and each memory band 234W having the data validity level equal to or below the first fragmentation point FP1 is assigned the write amplification queue 236W.

In some embodiments, the first fragmentation point FP1 defining the dust queue 236D and the write amplification queue 236W is determined based on a lowest validity level of the plurality of memory bands 234. In an example, the first fragmentation point FP1 is set as an average of a predefined validity limit (e.g., 100%) and the lowest validity level. In some situations, all of the plurality of memory bands 234 are assigned to the write amplification queue 236W, and the dust queue 236D is empty and does not include any memory band 234D. Alternatively, in some embodiments, a first subset of memory bands 234 is assigned to the write amplification queue 236W, and a second subset of memory bands 234 is assigned to the dust queue 236D. In another example, in accordance with a determination that a difference between the highest validity level (e.g., 50%) and the lowest validity level (e.g., 30%) of the plurality of memory bands 234 is greater than a predefined validity difference (e.g., 12.5%), the first fragmentation point FP1 is set as an average of the highest validity level and the lowest validity level. Neither of the queues 236D and 236W is empty. A first subset of memory bands 234 is assigned to the write amplification queue 236W, and a second subset of memory bands 234 is assigned to the dust queue 236D.

In some embodiments, in accordance with a determination that each of the dust queue 236D and the write amplification queue 236W has at least one memory band 234, the memory system 200 splits the first memory bandwidth $BW_1$ allocated to the plurality of memory bands 234 equally between the dust queue 236D and the write amplification queue 236W. In other words, in some situations, the plurality of queues 236 of memory bands 234 only include the dust queue 236D and the write amplification queue 236W, and the subset of queues 236S that are not empty includes both the dust queue 236D and the write amplification queue 236W. In some embodiments, in accordance with a determination that the dust queue 236D is empty, the memory system 200 allocates the first memory bandwidth $BW_1$ entirely to the write amplification queue 236W until one or more memory bands 234 are assigned to the dust queue 236D. In other words, the subset of queues 236S that is not empty includes the write amplification queue 236W, but not the dust queue 236D.

In some embodiments, the plurality of memory bands 234 are assigned to a subset of queues 236S of memory bands 234, and each of the subset of queues 236S is not empty and includes a respective subset of distinct memory bands 234 of the plurality of memory bands 234. For each of the subset of queues 236S, the respective subset of distinct memory bands 234 is organized according a band order determined based on priority levels 328 of the distinct memory bands 234, which are determined based on at least the data validity level and band age of each of the respective subset of distinct memory bands 234. A subset of the garbage collection operations are implemented on the respective subset of distinct memory bands 234 sequentially according to the band order. For example, in some situations, a dust queue 236D includes a first subset of memory bands 234 (e.g., P1-P8), which are organized according to at least the data validity level 320 and a band age of each of the first subset of memory bands 234 (e.g., P1-P8). A first subset of the garbage collection operations are implemented on the first subset of memory bands 234 (e.g., P1-P8) of the dust queue 236D sequentially. In some situations, a write amplification queue 236W includes a second subset of memory bands 234 (e.g., P9-PN), which are organized according to at least the data validity level 320 and a band age of each of the second subset of memory bands 234 (e.g., P9-PN). A second subset of the garbage collection operations are implemented on the second subset of memory bands 234 (e.g., P9-PN) of the write amplification queue 236W sequentially.

In some embodiments, while the garbage collection operations are implemented on the subset of queues 236S, which are not empty and includes at least one memory band 234, the memory system 200 dynamically adjusts the plurality of queues 236 of memory bands 234, the subset of queues 236S, and allocation of the first memory bandwidth $BW_1$. Further, in some embodiments, the plurality of queues 236 of memory bands 234, the subset of queues 236S, and the allocation of the first memory bandwidth $BW_1$ are updated according to a sampling frequency 304 (FIG. 3). In some embodiments, each of the subset of queues 236S is not empty, and a remainder of the plurality of queues of memory bands is distinct from the subset of queues 236S and includes at least one queue of memory bands that is empty.

In some embodiments, the first fragmentation point is 12.5%. A dust band validity is 62.50%, and a write amplification band validity is 50%. The memory system 200 has 200 credits of write in garbage collection and a target MAV level of 56.25%. A 50/50 credit allocation is applied to the dust queue 236D and the write amplification queue 236W. At a current time, 87.5 credits are allocated to host memory operations and equal to 43.5% of 200 credits allocated to garbage collection. The write amplification queue 236W is allocated with 100 credits, so is the dust queue 236D. For the write amplification queue 236W, 100 units of free space is gained from the plurality of memory bands that are relocated due to credits. 50 units of free space is lost due to 50% of the 100 units of processed are valid and written back. Net gain for write amplification is 50 units of free space. For the due queue 236D, 100 units of free space is gained from the plurality of memory bands that are relocated due to credits. 62.5 units of free space is lost due to 62.5% of the 100 units of processed are valid and written back. Net gain for the dust queue 236D is 37.5, and a total gain of the queues 236D and 236W is 87.5 units of. In other words, 87.50 units of is reclaimed by the relocation manager 508 and written by the host dispatcher 510 in response to host memory requests.

Figure 7A:
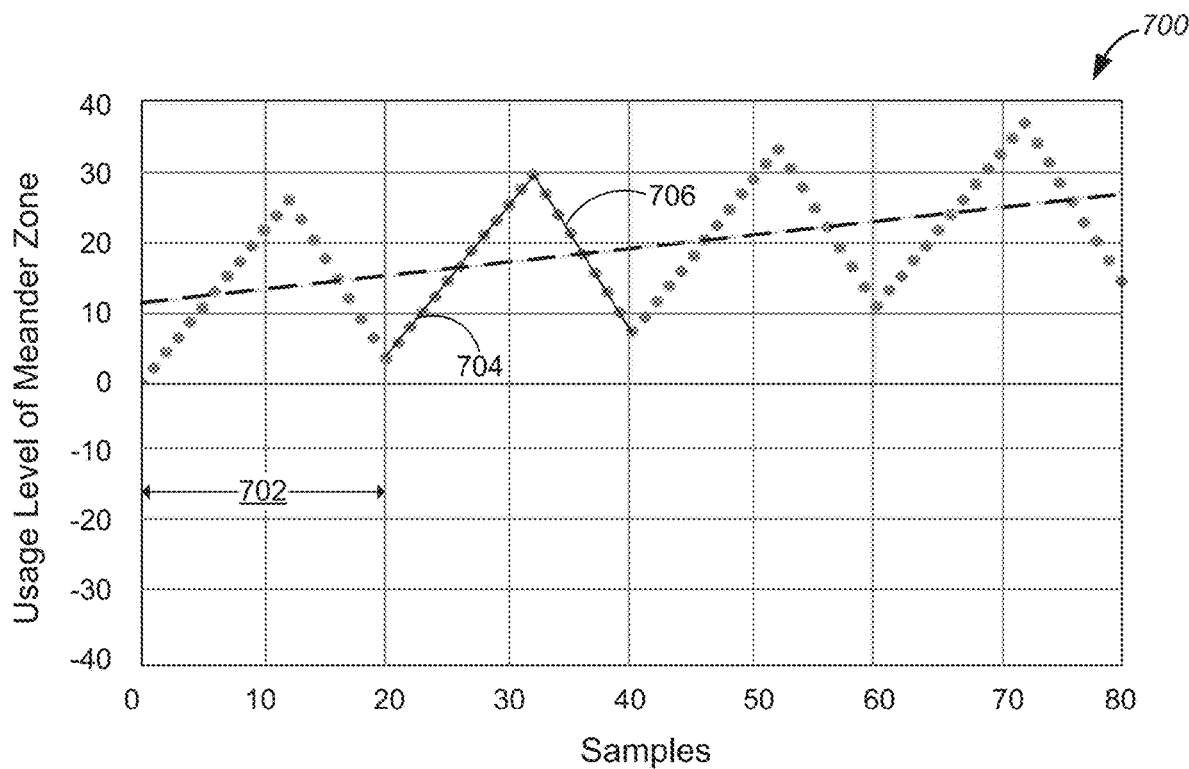
FIG. 7A is a temporal plot of a usage level of a meander zone that varies with a plurality of cycles when only a queue of dust bands exists, in accordance with some embodiments, respectively.

FIG. 7A is a temporal plot 700 of a usage level of a meander zone 406 that varies with a plurality of cycles 702 when only a queue 236D of dust bands 234D exists, in accordance with some embodiments, respectively. In an example, a write amplification ratio is 2.29, and an MAV level is 56.25% for the queue 236D of dust bands 234D. During each cycle 702, a positive slope 704 of the usage level of the meander zone 406 is followed by a negative slope 706 of the usage level of the meander zone 406, indicating that free space of the memory system 200 is first consumed and then produced during the respective cycle 702. For each cycle 702, free space consumption is greater than free space production. This is because dust bands 234D have lower invalidity than validity so less free space is reclaimed when the dust band 234D is processed in garbage collection operations.

Figure 7B:
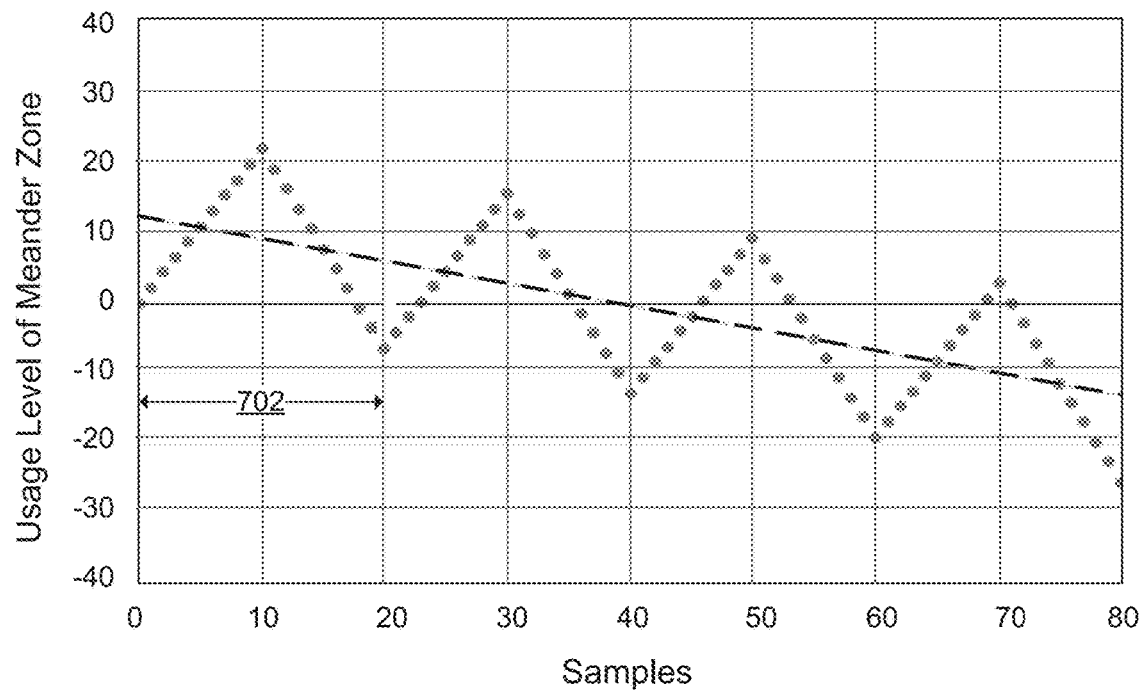
FIGS. 7B and 7C are two temporal plots of a usage level of a meander zone that varies with a plurality of cycles when only a queue of write amplification bands exists, in accordance with some embodiments, respectively.
Figure 7C:
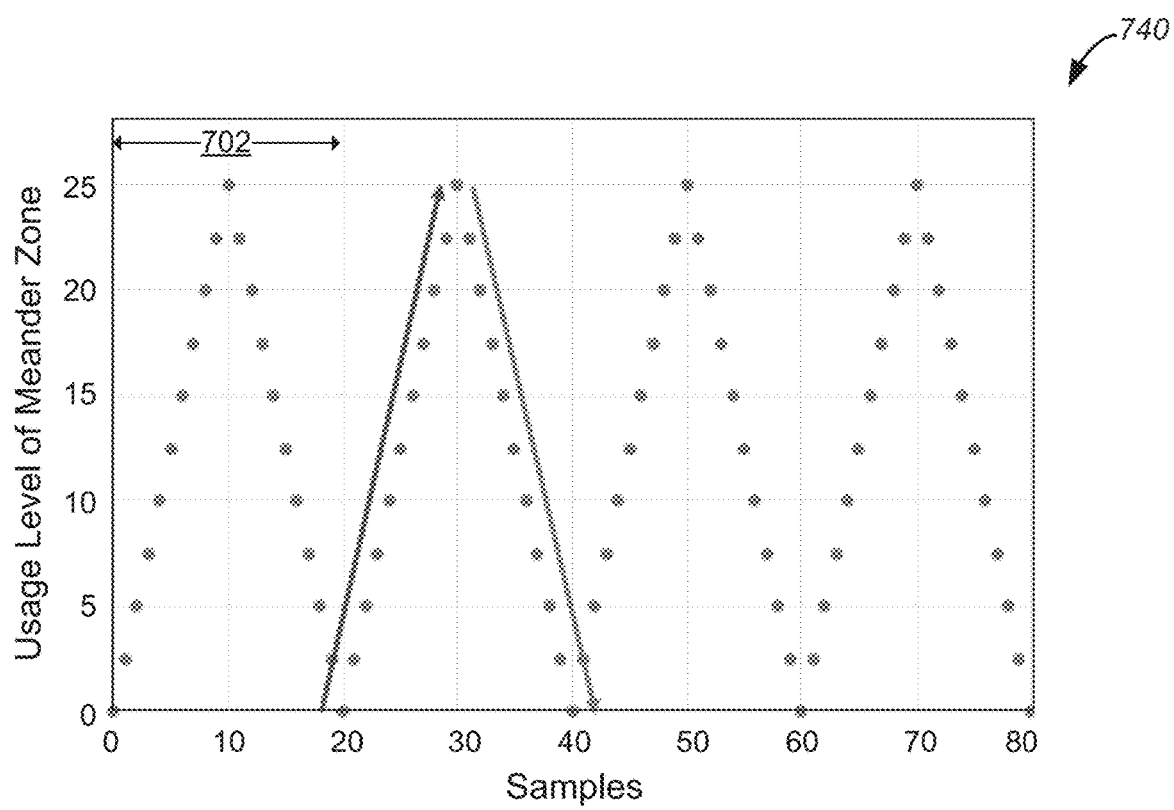

FIGS. 7B and 7C are two temporal plots 720 and 740 of a usage level of a meander zone 406 that varies with a plurality of cycles 702 when only a queue 236W of write amplification bands 234W exists, in accordance with some embodiments, respectively. The queues 236W of write amplification bands 234W in FIGS. 7B and 7C correspond to different write amplification ratios (e.g., 2.29 and 2) and MAV levels (e.g., 56.25% and 50%), respectively. During each cycle 702, a positive slope of the usage level of the meander zone 406 is followed by a negative slope of the usage level of the meander zone 406, indicating that free space of the memory system 200 is first consumed and then produced during the respective cycle 702. Referring to FIG. 7B, in some embodiments, free space production is greater than consumption for each cycle 702. This is because write amplification bands 234W have higher invalidity than validity so more free space is reclaimed when the band is processed in garbage collection operations. Referring to FIG. 7C, in some embodiments, free space consumption is substantially equal to production for each cycle 702.

Figure 7D:
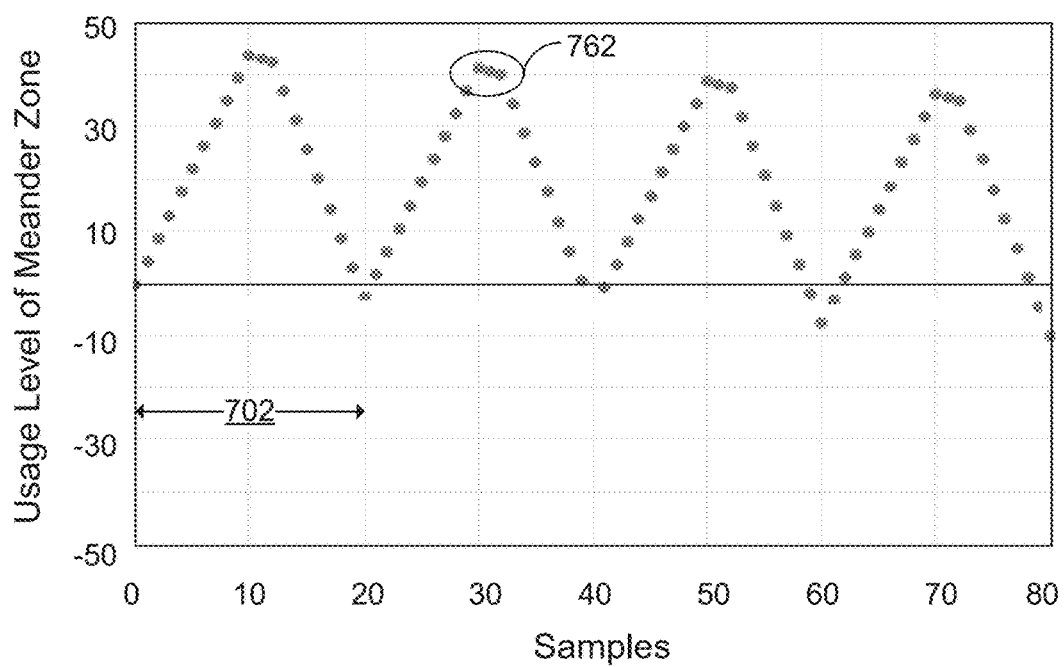
FIG. 7D is a temporal plot of a usage level of a meander zone that varies with a plurality of cycles when both queues of dust bands and write amplification bands exist, in accordance with some embodiments, respectively.

FIG. 7D is a temporal plot 760 of a usage level of a meander zone 406 that varies with a plurality of cycles 702 when both queues 236D and 236W of dust bands 234D and write amplification bands 234W exist, in accordance with some embodiments, respectively. Plateaus 762 are intersections of write amplification and dust validity/invalidity deltas. In some embodiments, the first fragmentation point is 12.5%. A dust band validity is 62.50%, and a write amplification band validity is 50%. The memory system 200 allocates a first memory bandwidth $BW_1$ (e.g., 200 credits) to garbage collection, and sets a target MAV level of 56.25%. A 50/50 credit allocation is applied to the dust queue 236D and the write amplification queue 236W. At a current time, 87.5 credits are allocated to host memory operations and equal to 43.5% of 200 credits allocated to garbage collection. The write amplification queue 236W is allocated with 100 credits, so is the dust queue 236D. For the write amplification queue 236W, 100 units of free space is gained from the plurality of memory bands that are relocated due to credits. 50 units of free space is lost due to 50% of the 100 units of space processed are valid and written back. Net gain for write amplification is 50 units of space. For the dust queue 236D, 100 units of free space is gained from the plurality of memory bands that are relocated due to credits. 62.5 units of free space is lost due to 62.5% of the 100 units of space processed are valid and written back. Net gain for the dust queue 236D is 37.5 units of free space, and a total gain of the queues 236D and 236W is 87.5 units of space. In other words, 87.50 units of space is reclaimed by the relocation manager 508 and written by the host dispatcher 510 in response to host memory requests.

Figure 8:
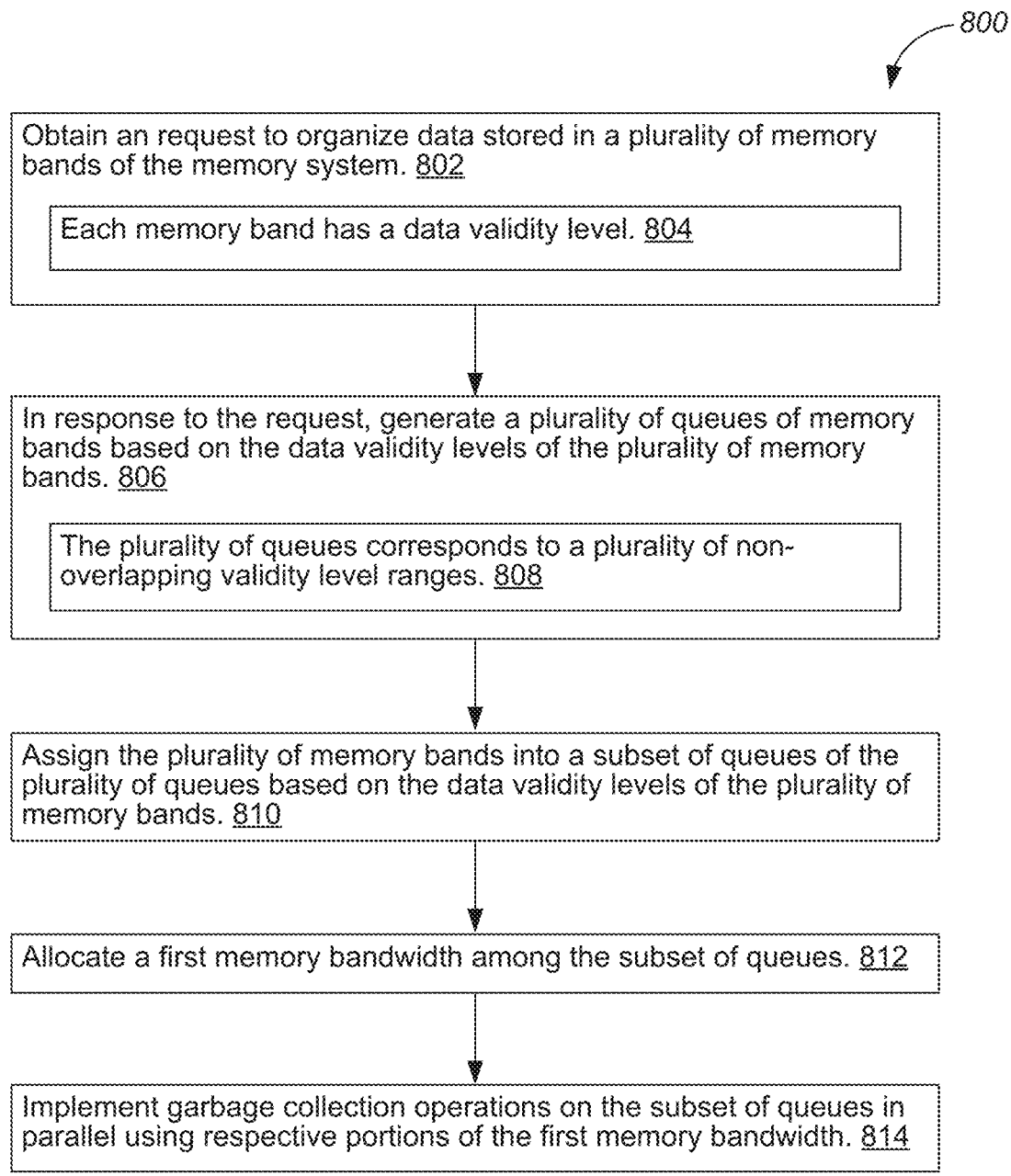
FIG. 8 is a flow diagram of an example method for managing memory space in a memory system, in accordance with some embodiments.

FIG. 8 is a flow diagram of an example method for managing memory space in a memory system 200, in accordance with some embodiments. The memory system 200 includes a memory device 240 coupled to a host 220 and having a memory controller 202 (FIG. 2) and non-volatile memory (e.g., a plurality of memory bands 234). The method 800 is implemented by the memory system 200. In an example, the memory system 200 includes an SSD that further includes the memory controller 202 and is configured to implement the method 800. The memory system 200 (specifically, the controller 202) obtains (operation 802) a request 308 to organize data stored in a plurality of memory bands 234 of the memory system 200, and each memory band 234 has (operation 804) a data validity level 320. In response to the request 308 (FIG. 3), the memory system 200 generates (operation 806) a plurality of queues 236 of memory bands 234 based on the data validity levels 320 of the plurality of memory bands 234. The plurality of queues 236 corresponds (operation 808) to a plurality of non-overlapping validity level ranges. The memory system 200 assigns (operation 810) the plurality of memory bands 234 into a subset of queues 236S of the plurality of queues 236 based on the data validity levels 320 of the plurality of memory bands 234, allocates (operation 812) a first memory bandwidth $BW_1$ among the subset of queues 236S, which are not empty and includes at least one memory band, and implements (operation 814) garbage collection operations on the subset of queues 236S in parallel using respective portions of the first memory bandwidth $BW_1$.

In some embodiments, the memory system 200 monitors a free space size 302 of the memory system 200, and in accordance with a determination that the free space size 302 of the memory system 200 is below a predefined level PL (e.g., the start setpoint 402B in FIG. 6), generates the request 308. Further, In some embodiments, in accordance with a determination that the free space size 302 of the memory system 200 is above the predefined level PL (FIG. 3), the memory system 200 aborts implementing the garbage collect operations. Additionally, In some embodiments, in accordance with a determination that the free space size 302 of the memory system 200 is below a critical level CL (e.g., the critical setpoint 402E in FIG. 6) that is lower than the predefined level, the memory system 200 suspends all host memory requests at least until the free space size 302 rises above the critical level CL (FIG. 3).

In some embodiments, the memory system 200 monitors a free space size of the memory system 200. In response to the request, the memory system 200 controls the free space size of the memory system 200 in a meander zone 406 (e.g., FIG. 4) having a space size range (e.g., between the setpoints 402B and 402D) that is smaller than a predefined range. Further, the memory system 200 has a number of input/output operations per second (IOPS) associated with the host memory requests, and the number of IOPS has a stability level that depends on the space size range of the meander zone 406 of the memory system 200. The stability level is higher than a stability target. Stated another way, in some embodiments, the meander zone 406 is set to be substantially narrow, and the stability level of the IOPS of the memory system 200 is therefore kept at a substantially higher stability level, e.g., above the stability target.

In some embodiments, in response to the request 308, the memory system 200 determines at least the first memory bandwidth $BW_1$ to be used to implement the garbage collection operations. Further, In some embodiments, the memory system 200 the first memory bandwidth $BW_1$ is determined as follows:

$$BW_1 = BW_H \cdot \frac{1}{1 - MAV} \cdot (1 + (MAV_T - MAV))$$

where $BW_1$ is the first memory bandwidth, $BW_H$ is a second memory bandwidth used to implement a plurality of host memory requests, MAV is a current moving average validity level of a current memory band that is being processed for garbage collection, and $MAV_T$ is a target moving average validity level of the plurality of memory bands 234.

In some embodiments, the plurality of queues 236 include both a dust queue 236D and a write amplification queue 236W (FIGS. 5A and 6). The memory system 200 allocates the first memory bandwidth $BW_1$ among the subset of queues 236S by in accordance with a determination that each of the dust queue 236D and the write amplification queue 236W is assigned with at least one memory band 234, splitting the first memory bandwidth $BW_1$ equally between the dust queue 236D and the write amplification queue 236W.

In some embodiments, the plurality of queues 236 including both a dust queue 236D and a write amplification queue 236W. The memory system 200 allocates the first memory bandwidth $BW_1$ among the subset of queues 236S by in accordance with a determination that the dust queue 236D is empty, allocating the first memory bandwidth $BW_1$ entirely to the write amplification queue 236W.

In some embodiments, the memory system 200 generates the plurality of queues 236 of memory bands 234 by at least identifying one or more fragmentation points 602 (FIG. 6) based on the data validity levels 320 of the plurality of memory bands 234 to define the plurality of non-overlapping validity level ranges. Further, In some embodiments, the one or more fragmentation points 602 (FIG. 6) include a first fragmentation point FP1 defining two of the plurality of non-overlapping validity level ranges corresponding to a dust queue 236D and a write amplification queue 236W included in the plurality of queues 236 of memory bands 234. Additionally, In some embodiments, the first fragmentation point FP1 is determined based on at least a lowest validity level of the plurality of memory bands 234. Each memory band 234 having the data validity level 320 above the first fragmentation point FP1 is assigned to the dust queue 236D, and each memory band 234 having the data validity level 320 equal to or below the first fragmentation point FP1 is assigned to the write amplification queue 236W. Also, in some embodiments, in accordance with a determination that each of the dust queue 236D and the write amplification queue 236W has at least one memory band 234, the memory system 200 splits the first memory bandwidth $BW_1$ equally between the dust queue 236D and the write amplification queue 236W. The subset of queues 236S includes both the dust queue 236D and the write amplification queue 236W. Alternatively, In some embodiments, in accordance with a determination that the dust queue 236D is empty, the memory system 200 allocates the first memory bandwidth $BW_1$ entirely to the write amplification queue 236W until one or more memory bands 234 are assigned to the dust queue 236D. The subset of queues 236S includes the write amplification queue 236W.

In some embodiments, each of the subset of queues 236S of memory bands 234 includes a respective subset of distinct memory bands 234 of the plurality of memory bands 234. The memory system 200 organizes the respective subset of distinct memory bands 234 according a band order determined based on at least the data validity level 320 and band age of each of the respective subset of distinct memory bands 234. A subset of the garbage collection operations are implemented on the respective subset of distinct memory bands 234 sequentially according to the band order.

In some embodiments, while the garbage collection operations are implemented, the memory system 200 dynamically adjusts the plurality of queues 236 of memory bands 234, the subset of queues 236S, and allocation of the first memory bandwidth $BW_1$. Further in some embodiments, the plurality of queues 236 of memory bands 234, the subset of queues 236S, and the allocation of the first memory bandwidth $BW_1$ are updated according to a sample rate. Additionally, in some embodiments, each of the subset of queues 236S is not empty, and a remainder of the plurality of queues 236 of memory bands 234 is distinct from the subset of queues 236S and includes one or more queues 236R of memory bands 234 that are empty.

Memory is also used to store instructions and data associated with the method 800, and includes high-speed random-access memory, such as SRAM, DDR DRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory, optionally, includes one or more storage devices remotely located from one or more processing units. Memory, or alternatively the non-volatile memory within memory, includes a non-transitory computer readable storage medium. In some embodiments, memory, or the non-transitory computer readable storage medium of memory, stores the programs, modules, and data structures, or a subset or superset for implementing method 800. Alternatively, in some embodiments, the electronic system implements the method 800 at least partially based on an ASIC. The memory system 200 of the electronic system includes an SSD in a data center or a client device.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory, optionally, stores a subset of the modules and data structures identified above. Furthermore, the memory, optionally, stores additional modules and data structures not described above.

The terminology used in the description of the various described implementations herein is for the purpose of describing particular implementations only and is not intended to be limiting. As used in the description of the various described implementations and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. A method for managing memory space, comprising:
   at a memory system including a controller and non-volatile memory:
      obtaining a request to organize data stored in a plurality of memory bands of the memory system, each memory band having a data validity level;
      in response to the request, generating a plurality of queues of memory bands based on the data validity levels of the plurality of memory bands, the plurality of queues corresponding to a plurality of non-overlapping validity level ranges;
      assigning the plurality of memory bands into a subset of queues of the plurality of queues based on the data validity levels of the plurality of memory bands;
      allocating a first memory bandwidth among the subset of queues; and
      implementing garbage collection operations on the subset of queues in parallel using respective portions of the first memory bandwidth.

2. The method of claim 1, further comprising:
   monitoring a free space size of the memory system; and
   in accordance with a determination that the free space size of the memory system is below a predefined level, generating the request.

3. The method of claim 2, further comprising:
in accordance with a determination that the free space size of the memory system is above the predefined level, aborting implementing the garbage collect operations; and
in accordance with a determination that the free space size of the memory system is below a critical level that is lower than the predefined level, suspending all host memory requests at least until the free space size rises above the critical level.

4. The method of claim 1, further comprising:
monitoring a free space size of the memory system; and
in response to the request, controlling the free space size of the memory system in a meander zone having a space size range that is smaller than a predefined range.

5. The method of claim 4, wherein the memory system has a number of input/output operations per second (IOPS) associated with host memory requests, and the number of IOPS has a stability level that depends on the space size range of the meander zone of the memory system, the stability level higher than a stability target.

6. The method of claim 1, further comprising:
in response to the request, determining at least the first memory bandwidth to be used to implement the garbage collection operations.

7. The method of claim 6, wherein the first memory bandwidth is determined as follows:

$$BW_1 = BW_H \cdot \frac{1}{1 - MAV} \cdot (1 + (MAV_T - MAV))$$

where $BW_1$ is the first memory bandwidth, $BW_H$ is a second memory bandwidth used to implement a plurality of host memory requests, MAV is a current moving average validity level of a current memory band that is being processed for garbage collection, and $MAV_T$ is a target moving average validity level of the plurality of memory bands.

8. The method of claim 1, wherein the plurality of queues includes both a dust queue and a write amplification queue, allocating the first memory bandwidth among the subset of queues further comprising:
in accordance with a determination that each of the dust queue and the write amplification queue is assigned with at least one memory band, splitting the first memory bandwidth equally between the dust queue and the write amplification queue and in doing so maintains free space within the meander zone to maintain IOPs stability within a target range.

9. The method of claim 1, wherein the plurality of queues including both a dust queue and a write amplification queue, allocating the first memory bandwidth among the subset of queues further comprising:
in accordance with a determination that the dust queue is empty, allocating the first memory bandwidth entirely to the write amplification queue.

10. A memory system, comprising:
a controller;
non-volatile memory storing data; and
memory storing one or more programs for execution by the controller, the one or more programs further comprising instructions for:
obtaining a request to organize data stored in a plurality of memory bands of the memory system, each memory band having a data validity level;
in response to the request, generating a plurality of queues of memory bands based on the data validity levels of the plurality of memory bands, the plurality of queues corresponding to a plurality of non-overlapping validity level ranges;
assigning the plurality of memory bands into a subset of queues of the plurality of queues based on the data validity levels of the plurality of memory bands;
allocating a first memory bandwidth among the subset of queues; and
implementing garbage collection operations on the subset of queues in parallel using respective portions of the first memory bandwidth.

11. The memory system of claim 10, generating the plurality of queues of memory bands further comprising:
identifying one or more fragmentation points based on the data validity levels of the plurality of memory bands to define the plurality of non-overlapping validity level ranges.

12. The memory system of claim 11, wherein the one or more fragmentation points include a first fragmentation point defining two of the plurality of non-overlapping validity level ranges corresponding to a dust queue and a write amplification queue included in the plurality of queues of memory bands.

13. The memory system of claim 12, wherein the first fragmentation point is determined based on at least a lowest validity level of the plurality of memory bands, and wherein each memory band having the data validity level above the first fragmentation point is assigned to the dust queue, and each memory band having the data validity level equal to or below the first fragmentation point is assigned to the write amplification queue.

14. The memory system of claim 12, the one or more programs further comprising instructions for:
in accordance with a determination that each of the dust queue and the write amplification queue has at least one memory band, splitting the first memory bandwidth equally between the dust queue and the write amplification queue, the subset of queues including both the dust queue and the write amplification queue.

15. The memory system of claim 12, the one or more programs further comprising instructions for:
in accordance with a determination that the dust queue is empty, allocating the first memory bandwidth entirely to the write amplification queue until one or more memory bands are assigned to the dust queue, the subset of queues including the write amplification queue.

16. The memory system of claim 10, wherein each of the subset of queues of memory bands includes a respective subset of distinct memory bands of the plurality of memory bands, the one or more programs further comprising instructions for:
organizing the respective subset of distinct memory bands according a band order determined based on at least the data validity level and band age of each of the respective subset of distinct memory bands, where a subset of the garbage collection operations are implemented on the respective subset of distinct memory bands sequentially according to the band order.

17. A non-transitory computer-readable storage medium, storing one or more programs for execution by a controller, the one or more programs further comprising instructions for:
at a memory system including the controller and non-volatile memory:
obtaining a request to organize data stored in a plurality of memory bands of the memory system, each memory band having a data validity level;

in response to the request, generating a plurality of queues of memory bands based on the data validity levels of the plurality of memory bands, the plurality of queues corresponding to a plurality of non-overlapping validity level ranges;

assigning the plurality of memory bands into a subset of queues of the plurality of queues based on the data validity levels of the plurality of memory bands;

allocating a first memory bandwidth among the subset of queues; and implementing garbage collection operations on the subset of queues in parallel using respective portions of the first memory bandwidth.

18. The non-transitory computer-readable storage medium of claim 17, the one or more programs further comprising instructions for, while the garbage collection operations are implemented, dynamically:

adjusting the plurality of queues of memory bands, the subset of queues, and allocation of the first memory bandwidth.

19. The non-transitory computer-readable storage medium of claim 18, wherein the plurality of queues of memory bands, the subset of queues, and the allocation of the first memory bandwidth are updated according to a sample rate.

20. The non-transitory computer-readable storage medium of claim 18, wherein each of the subset of queues is not empty, and a remainder of the plurality of queues of memory bands is distinct from the subset of queues and includes one or more queues of memory bands that are empty.

* * * * *